Aug. 27, 1963  L. W. MURPHY ETAL  3,101,508
METHOD OF FACILITATING IMMOBILIZATION AND/OR SLAUGHTER
OF CATTLE AND OTHER LARGE DOMESTIC ANIMALS
Filed July 24, 1961  2 Sheets-Sheet 1
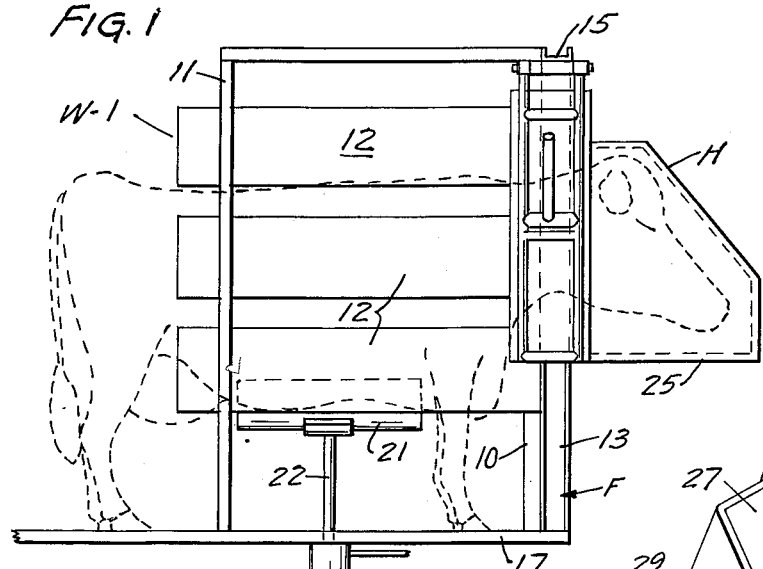
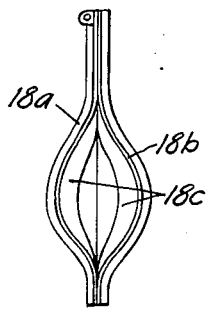
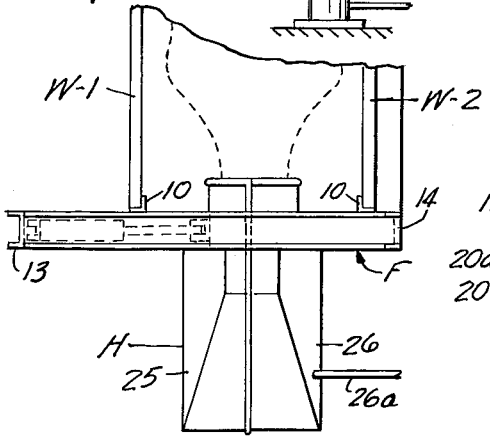
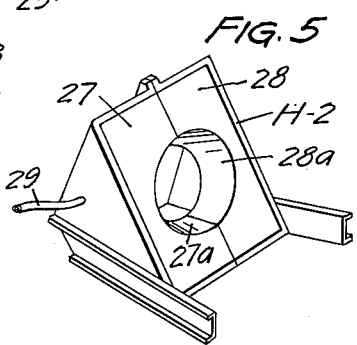
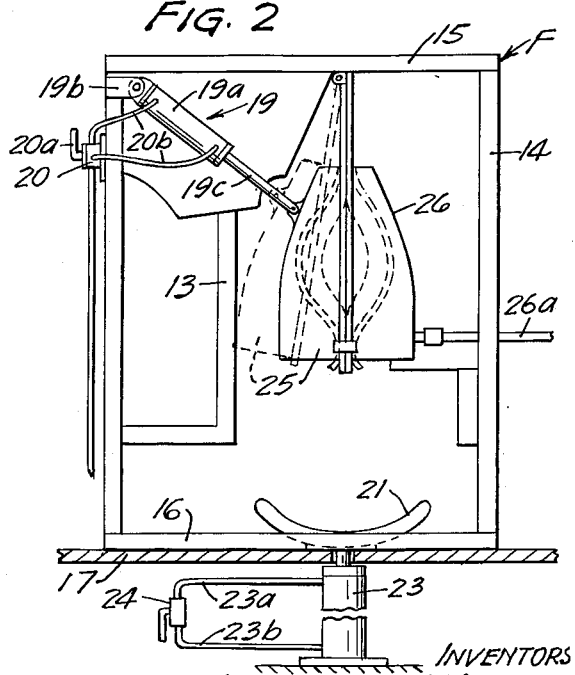
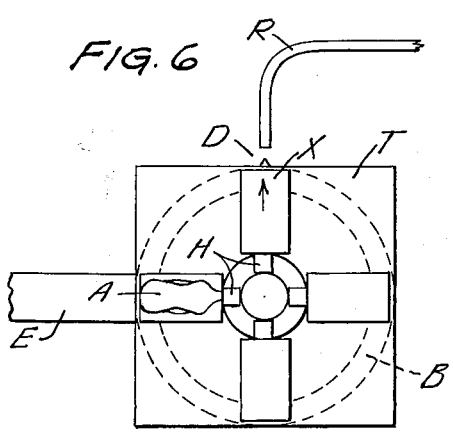
INVENTORS
LAURENCE W. MURPHY
CHRISTIAN D. MACY
BY Williamson + Palmatier
ATTORNEYS

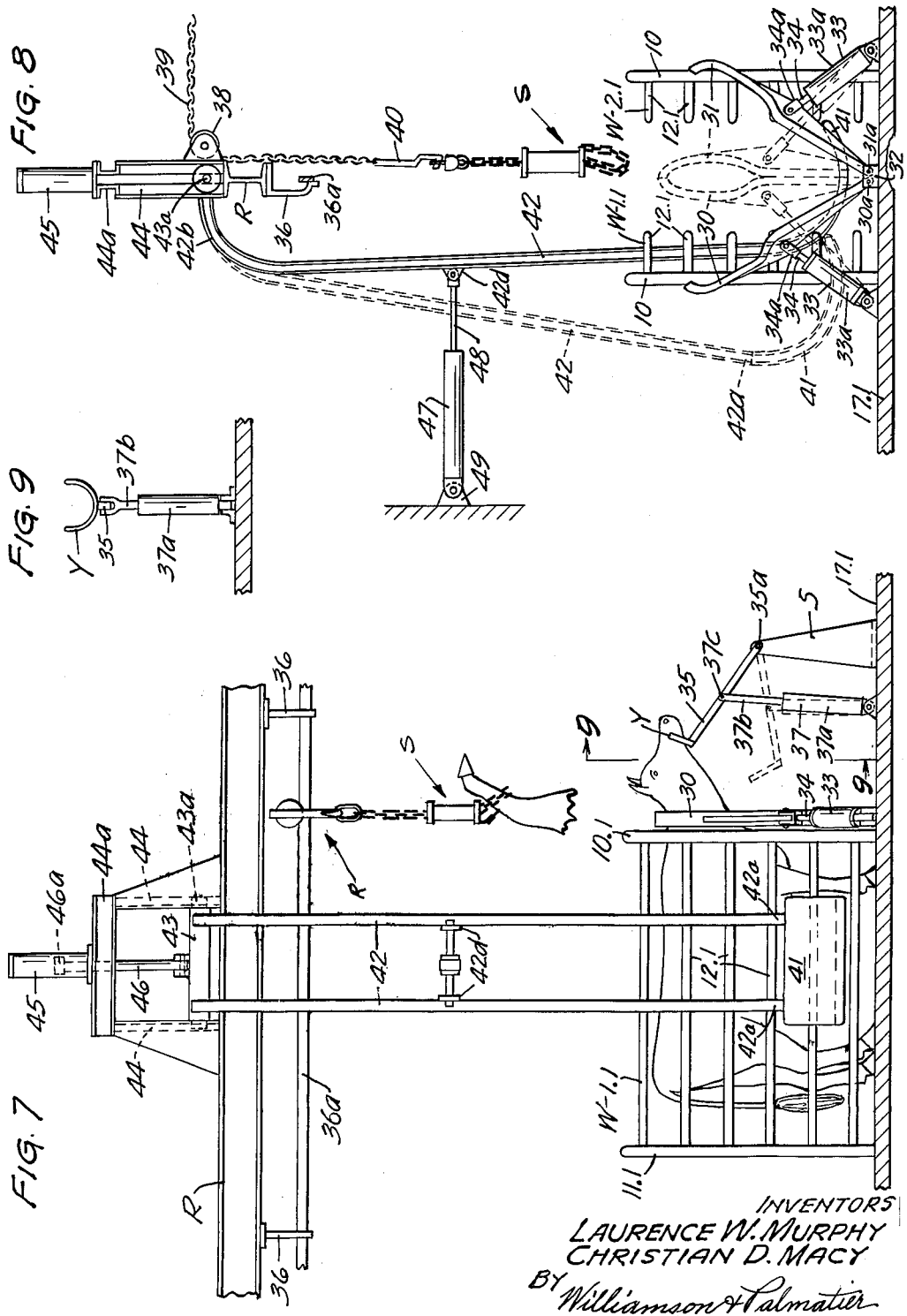

3,101,508
METHOD OF FACILITATING IMMOBILIZATION AND/OR SLAUGHTER OF CATTLE AND OTHER LARGE DOMESTIC ANIMALS
Laurence W. Murphy and Christian D. Macy, Austin, Minn., assignors to Geo. A. Hormel & Company, Austin, Minn., a corporation of Delaware
Filed July 24, 1961, Ser. No. 126,275
8 Claims. (Cl. 17—45)

This invention relates to methods and apparatus for use in packing houses and butchering stations, and has particular application to methods and apparatus for facilitating the immobilization and slaughtering of the larger slaughter animals such as cattle and sheep.

This application is a continuation-in-part and related to our co-pending application entitled "Cattle Immobilizing Apparatus and Process," Serial Number 52,984.

Broad aspects of the invention we disclose herein are applicable to conventional slaughtering methods where first the animal is desensitized or otherwise immobilized through stunning or through anesthetizing, and is thereafter shackled and/or suitably supported with throat exposed, for "sticking" or cutting of the essential arteries, as required by United States laws. The essential or broader aspects of the invention are equally applicable to kosher slaughtering of cattle and sheep where the throat of the animal must be cut by a rabbi and whereafter the animal, without contamination of the cut or throat portion thereof must be suitably suspended or positioned with head and throat extending downwardly for subsequent and full bleeding of the animal before butchering.

In our co-pending application we disclose a substantial improvement in both method and apparatus for successively handling animals and preparing them for slaughter through immobilization, stunning or anesthetizing of the animal, and for adequately confining, engaging and restraining the animal with the head held immovable by simple, quickly applied method steps and apparatus.

The prior art known to us, while showing lanes and walls for partially restraining animals at the time they are desensitized by electrical shock, cartridge through skull, or anesthetizing, has disclosed no positive steps or mechanism for supporting the weight of the animal after immobilization thereof, or for combining a body-supporting step or mechanism with restraining and head-locating means to humanely assure desensitizing or other immobilization of the slaughter animal upon the first actuation of the immobilizing medium. Consequently, upon desensitizing or other immobilization, slaughter animals fell in random positions and often one or both of the hind legs were positioned beneath the body, making shackling of the two hind legs and subsequent lifting or moving of the animal difficult and impractical.

It is an object of our present invention to provide readily adjustable means for supporting and predetermining the erect positioning of the slaughter animal's body after the animal is stunned, desensitized or otherwise unconscious, and with the hind legs suspended free for immediate application of a shackle to readily facilitate uplifting of the animal for subsequent sticking or bleeding, or to facilitate other disposal of the animal after immobilization.

A further object is the provision of a method and apparatus which closely cooperates with features of the invention disclosed in our co-pending application Serial Number 52,984 to improved and simplify substantially the overall restraining medium employed to precisely position all essential parts of the animal including head and neck, for accurate and humane immobilization through stunning and other immobilization, including anesthesis, to assure speedy and accurate immobilization, and with elimination of the possibility of the animal slipping or falling prior to and after immobilization.

An additional and more specific object of the invention is the provision of method and apparatus especially adapted for kosher slaughtering which employs the basic principles of restraining, confining and supporting the slaughter animal in erect position before and after kosher cutting of the throat and which includes, as an important feature, method steps and apparatus for uplifting the head of the animal with the throat exposed for facilitating slashing and cutting of the essential arteries as required in kosher killing, and which subsequently makes provision for facilitating upending of the slaughtered animal without possibility of contamination of the wound or cut at the throat, and with subsequent removal for complete bleeeding.

The foregoing and other objects and accomplishments of the invention will be more fully set forth in the following description made in connection with the accompanying drawings, wherein like reference characters refer to the same or similar parts throughout the several views and in which:

FIG. 1 is a side elevation of one form of our invention which is applicable to a single stall or multiple stall movable type of apparatus for restraining cattle, and for either stunning or anesthetizing the animal;

FIG. 2 is a front elevation of the same unit;

FIG. 3 is a partial top plan view of the same;

FIG. 4 is a front elevation of the neck-clamping restraining jaws with the parts of the anesthetizing hood removed;

FIG. 5 is a detail perspective view showing an alternative unit for anesthetizing the animal where only the muzzle portion of the animal is surrounded and substantially sealed within a hood;

FIG. 6 is a diagrammatic top plan view of a multiple stall, turn-table type of apparatus wherein cattle may be successively treated, entering one at a time, and being processed during movement as by turn-table action of the support for the several stalls and ultimately delivered at a point where shackles may be applied to the rear legs of the immobilized animal and thereafter, the animal elevated and removed head downwardly, suspended from a trolley diagrammed in FIG. 6.

The second sheet of the drawings shows the basic principles of our invention applied to apparatus and including some additional elements which in combination are particularly adapted for kosher slaughtering of cattle and other large domestic animals.

FIG. 7 shows a side elevation of one form of apparatus for kosher slaughtering embodying our invention;

FIG. 8 shows a front elevation of the same, with dotted lines indicating the moved and operating position of restraining and supporting elements of the apparatus; and FIG. 9 is a vertical section taken on the line 9—9 of FIG. 7 showing the muzzle-engaging element and fluid-actuated lift for tilting the head of the animal upwardly and maintaining the head in such position while restrained to expose the throat for slaughter.

Referring now to the form of the invention shown in FIGS. 1 to 3 inclusive, a confining stall is provided comprising substantially spaced, generally parallel vertical side walls W–1 and W–2 respectively, formed as shown in each instance by a pair of upstanding posts 10 and 11 respectively, having secured thereto in spaced relation a plurality of boards or slats 12. Posts 10 and 11 may be of angle iron construction as illustrated in FIG. 3. The forward posts 10 of each pair have closely positioned thereto and preferably rigidly secured thereto, an open rectangular head-positioning frame F which, as shown, comprises spaced upstanding posts of channel construction 13 and 14, and the top channel beam 15 interconnecting the upper ends of the two, and a lower reinforcing member or beam 16. The stall includes a supported floor 17 positioned substantially horizontally upon which the animal can stand with its hind legs usually disposed rearwardly and outwardly of the walls W-1 and W-2, and with its head extending forwardly through the overall frame F comprising parts 13 to 16 inclusive, and with its torso and the greater portion of its body closely confined between the parallel upstanding walls W-1 and W-2.

The head restraining elements, as shown in FIGS. 1 to 3 inclusive, are similar to one form of the head positioning jaws disclosed in our co-pending application and as shown, comprise a neck-encircling and head-positioning medium in the form of a pair of clamping jaws 18a and 18b hinged together at their upper ends and having opposed appropriately curved intermediate and lower portions for in combination, encircling the neck of an animal such as a steer, said portions being lined with thick pads 18c of compressible material such as sponge rubber, which actually contact and press against the sides of the animal's neck in operation. The jaws 18a and 18b are hinged together as shown in FIG. 4 at their upper ends and may both be movable for retractive, spread-apart positioning to receive the animal's neck or as shown in FIGS. 2 and 4, one may be stationary and the other movable through suitable actuating mechanism.

Actuating mechanism indicated as an entirety by the numeral 19, of pneumatic or hydraulic type may be employed, comprising a diagonally disposed pneumatic cylinder 19a pivoted at its upper end to a suitable bracket 19b, attached to the rectangular frame F and having an elongated piston rod 19c projecting from the inner end thereof, controlled in linear movement by an enclosed piston, the forward and lower end of the piston rod 19c being pivotally connected to the jaw 18a directly or through the instrumentality of a hood section (if anesthetizing apparatus is employed for immobilizing the animal). Actuation of the pneumatic mechanism 19 and the movable jaw 18a is suitably controlled by valve and conduit means which as shown, comprises a 3-way rotary valve 20 with control handle 20a and suitable conduits 20b connecting the valve passages with the upper and lower portions of the inside of pneumatic cylinder 19a.

In close cooperation with the animal confining and restraining steps and the media which includes the stall defined by the parallel upstanding walls W-1 and W-2, and the neck encircling jaws 18a and 18b, we provide an instantly adjustable mechanism and method step for cradling the belly of the large slaughter animal to support the entire weight of the animal free of its rear legs, or all legs, prior to and immediately after immobilization and/or kosher slaughtering thereof. While numerous forms of swingable or longitudinally movable belly-engaging apparatus may be employed, we illustrate in FIGS. 1 and 2 a simplified supporting unit which as shown consists in an enlarged belly-supporting plate 21 contoured in arcuate cross section and extending from a line rearwardly of the fore legs of the animal to the udder and affixed to the upper end of one or more piston rods 22 which have pistons (not shown) at the lower ends thereof slidably mounted within conventional pneumatic or hydraulic cylinders 23. The cylinders are disposed as shown below the floor 17 of the stall and may be suspended from that floor if the floor constitutes a turn-table or movable device, or may be supported as shown upon ground or the floor of a building. It will of course be understood that the cylinders 23 and/or other actuating and adjusting mechanism may be supported in pairs spaced apart at the sides of the stall and above the floor 17 thereof.

In the form shown a single enlarged pneumatic cylinder 23 is shown centrally disposed below the belly plate 21 and has control mechanism connected therewith, including a three-way valve 24 and conduit connections 23a and 23b with the upper and lower portions of the inside of cylinder 23 and with the appropriate passages of the valve 24. The valve may be operated by electromagnetic push button control or manually, as desired.

From the foregoing it will be seen that adjustability for the height of the belly support and the upward movement thereof is provided so that animals varying considerably in height and length of legs may be properly accommodated and the belly engaged and bodies lifted as desired off the normal support of their hind legs.

The apparatus and method described to this point provides for the very effective support of the body of the animal and the confining and restraining of the body against lateral movement, and for positively holding the neck and head in a predetermined position. Thus electric stunning or pneumatic stunning by a bolt type conventional medium may be very quickly and humanely carried out, with the assurance that the first shock will be accurately delivered through the top of the skull of the animal to completely desensitize the animal. Immediately after becoming unconscious the animal will slump but due to the cooperation of the belly plate 21 and the restraining walls, will remain generally in upstanding position without turning or twisting axially of the torso. The weight of the entire body or all parts of the body but the legs are then supported solely by the belly plate 21. The rear legs of the animal are then suspended in parallel relation and from the rear of the stall these legs may be readily shackled and the animal upended from the rear if desired, upon wide opening of the jaws 18a and 18b, or the animal may be dragged rearwardly after shackling or may be caused to slide down a descending chute.

A head-surrounding anesthetizing hood H of the same construction as one of the hoods shown and disclosed in our pending application, S.N. 52,984 is illustrated in FIGS. 1-3 of the drawings, comprising a pair of hood shell sections 25 and 26 respectively, which are as shown interconnected and operative with the jaw sections 18a and 18b. Section 26 of the hood is stationary as shown and is provided with a small intake conduit 26a for supplying anesthetizing gas such as carbon dioxide to the interior of the hood when the same is clamped in operative position about the head of the domestic animal. The other section 25 is swingable with the jaw 18a and of course, is actuated by the same pneumatic or hydraulic actuating mechanism 19 to be swung into closed position. The hood sections at their inner edges are provided with suitable compressible material 18c for effecting a tight seal along all of the opposed edges of the hood sections when the same are swung together. The forward face edges of the jaws 18a and 18b are sealed tightly against the rear portions of the hood section.

In FIG. 5 an alternative construction of anesthetizing hood H-2 is illustrated which was also illustrated in our co-pending application, S.N. 52,984. This hood H-2 is adapted to surround and enclose only the muzzle including the nostrils of the animal and comprises two hinged sections 27 and 28 having substantially semi-circular compressible sealing edges 28a and 27a respectively which actually engage and seal against the muzzle of the animal some distance above the nostrils. A small conduit 29 is connected with the interior of this hood H-2 for supplying the anesthetizing gas.

It will of course be understood that the various hood structures for quickly enabling the animal to be anesthetized while in restrained and immovable head position, are well adapted for such type of immobilization but that the apparatus and steps previously recited without use of the anesthetizing hood are also particularly adapted for humanely immobilizing an animal by electrical shock treatment or by stunning bolt which is manipulated by explosive or mechanical means to drive a bolt or other stunning mechanical element inwardly through the skull of the animal while the animal is completely restrained by the apparatus disclosed.

In FIGS. 7 to 9 inclusive another form of our invention is illustrated particularly adapted for kosher slaughtering as prescribed by law. In this form of the invention certain features are added to the basic principles of the invention previously recited, which are particularly suited to requisites of kosher slaughtering. Similar parts of this second form will be numbered identically with corresponding certain parts of the apparatus first described.

FIG. 7 illustrates a cow or steer properly confined and restrained within a stationary stall of the general construction of the stall illustrated previously, having spaced side walls W–1.1 and W–2.1 defined by two sets of forward and rear posts 10.1 and 11.1 which have transversely secured thereto in parallel spaced relations, rungs or bars 12.1 having as shown curved ends which bring the medial portion of the bars in close spaced relation to confine the flanks of the animal. A pair of neck-encircling and clamping jaws 30 and 31 are provided, hinged at their lower ends on pivots 30a and 31a to a mounting bracket or block 32 which may be affixed to the floor 17.1 of the stall. The jaws although not illustrated in detail as to lining are constructed with compressible linings similar to the jaws first described in this specification, but both jaws swing to a wide open position shown in full lines in FIG. 8. These jaws are actuated by a pair of similar pneumatic or hydraulic jacks 33 having as shown pneumatic cylinders 33a equipped with pistons and piston rods 34 which at their outer ends have clevises 34a pivotally connected with longitudinal ribs provided on the exterior of the shank portions of the jaws 30 and 31.

The apparatus for kosher slaughering is provided some distance in advance of the neck-encircling jaws 30 and 31 with mechanism for engaging and upwardly tilting the head of the animal and exposing the throat thereof after the neck is immovably constrained by the jaws 30 and 31. While this mechanism or unit may take various forms, a simple form is disclosed comprising an elongated lever 35 pivoted at its forward end on a pin 35a to an upstanding pedestal or rigid standard S. The inner end of lever 35, as shown in FIG. 9 has rigidly attached thereto a U-shaped jaw-engaging yoke Y which is adapted to confine and engage the underside of the lower jaw of the animal after the restraining clamping sections 30 and 31 have been applied to precisely position and restrain the neck of the animal. The lever 35 is actuated by suitable means such as the hydraulic or pneumatic jack structure 37 which as shown comprises a cylinder 37a having a piston rod 37b contained therein, the upper end of which is pivotally attached at 37c to the medial portion of the link 35. The piston, piston rod and their actuation is controlled by suitable valve mechanism not shown, connected with a source of air under pressure or hydraulic fluid. The dotted line in FIG. 7 shows the retracted position of the mechanism including link 35, cylinder 37a and piston rod 37b, while the full line positions show the animal's head uptilted through confining and engagement of the lower jaw by the yoke Y. It will be noted how the throat of the animal is completely exposed and with the cooperation of the neck-encircling clamping jaws 30 and 31, the head will be retained in the upwardly tilted position with throat exposed for cutting the throat and severing the carotid artery and jugular vein by the operator or rabbi.

With this type of slaughtering we have found the close cooperation of the animal-weight-support is of particular value for conforming to other requirements of kosher slaughtering. In FIGS. 7 and 8 one suitable form of belly-engaging torso support is illustrated, having facilities for vertical adjustment and readily controllable application to and beneath the belly of the slaughter animal.

In kosher slaughtering, it is required that a station or rail be superimposed approximately sixteen feet above the supporting floor of the station or stall and that provision be made for upending the steer or animal through shackling of its rear legs and subsequent hoisting of the carcass. In such operation the cut or wound must not contact any unsanitary apparatus, ground or the like.

We prefer to support our weight-lifting, belly-engaging mechanism in this form of the invention from the rather high suspended rails or station, shown in FIGS. 7 and 8, which employs an I-beam rail R extending longitudinally above the stall at a height of about sixteen feet. The rail R has hanger brackets 36 depending therefrom which support the smaller bleed rail 36a extending in parallel relation below supporting rail R. The bleed rail 36a has a horizontal edge along which the hook or roller at the outer end of a shackle (not shown) may be longitudinally moved. The upper support and rail also has attached thereto a sheave 38 over which hoist chain 39 is trained, having at the depending end thereof a shackle hook 40 by which the shackle attached to the hind legs of the slaughter animal may be attached and the shackle thereafter shifted to have a roller or additional hook supported upon the bleed rail 36a with the head of the animal then depending and positioned well above floor level.

It will be seen in FIG. 8 that the shackle S of the type known in the trade as the Globe shackle and manufactured by The Globe Co. is shown attached to the hook 40 and which engages preferably one of the hind legs of the animal. This shackle is adapted to be transferred to the bleed rail 36a and suspended from the conventional roller mounted hook device R, also of the type manufactured and sold by The Globe Co. This well known shackle supporting roller mounted hook device R is diagrammatically illustrated in FIG. 7.

Our belly-engaging, body-supporting plate for the body of the animal in the form shown in FIGS. 7 to 9 inclusive comprises a wide concave belly-supporting plate 41 rigidly secured as shown, across the lower curved ends 42a of a pair of parallel elongated tubular beams 42 which are suspended from curved upper end portions 42b attached to the vertically adjustable carriage or cross block 43. Cross block 43 is slidably mounted between a pair of upstanding post members 44 secured to the top of the I-beam rail R and is connected and reinforced at its top by cross channels 44a. Mounted upon said channels 44a and rigidly attached thereto is a pneumatic or hydraulic cylinder 45 having working therein a piston 46a which has affixed to the lower end thereof the piston rod 46 which in turn at its lower end is secured to the carriage 43 for adjusting the height of the same and consequently the heights of beams 42 within certain limits. The upper curved ends 42b of the beams 42 are pivotally connected as shown in FIG. 8 through trunnions 43a on the carriage block 43. With said described construction the depending beams 42 and consequently the belly plate 41 rigidly attached to the lower ends thereof may be swung by actuating means from the dotted line position of FIG. 8 to the full line position. Simple power actuating means are provided as illustrated, being in the form of a pneumatic or hydraulic jack comprising a cylinder 47 having a piston and piston rod 48 slidable therein, said cylinder being pivoted at its outer end to a supporting bracket 49 affixed to a vertical wall, as shown. The outer end of the piston rod 48 is pivotally connected to a heavy lug 42d rigidly carried by the intermediate portion of the beams 42. Valve means and suitable conduits from a source of fluid under pressure such as compressed air (not shown) are provided for controlling reciprocation of the piston rod 48 to swing the belly plate under the animal whereupon if needed the lift adjustment cylinder mechanism 45 and 46a may be actuated to raise the lowered curved ends of the boom arms 42 to engage the belly of the animal and actually slightly lift the same while the animal is still standing erect on its own legs.

Thus it will be seen, as in the form of the invention first described, that the larger slaughter animals such as steers are additionally constrained by the application of the belly plate 41 in body-supporting position with the cooperation of the walls W–1.1 and W–2.1 of the stall and the neck restrainer comprising the clamping jaws 30 and 31. These compounds all work together to prevent struggling and twisting of the animals and the retention of the neck of the animal in a predetermined position.

With the animal's head uplifted as shown in FIG. 7 and throat exposed, the essential arteries are cut with one slash of a knife by the rabbi or operator, thereby almost instantly immobilizing the animal and causing it to stagger under its own weight. The weight of the entire body is then supported by our adjustable belly plate 41. Thereafter, the hind legs or one leg may be readily shackled and the upper end of the shackle links secured to the lift hook on hoisting chain 39, and the chain with the hook thereon pulled upwardly, upending the animal off of the belly support 41 without danger of the wound or cut being contaminated by engagement with the floor or any parts of the apparatus. The yoke Y retains the animal's head in upraised position during said upending step preventing dropping thereof and contamination of the wound.

It is of course understood that prior to upending and elevating the slaughtered animal, the jaws 30 and 31 which it will be noted are pivoted at their lower ends, are retracted to the wide open position shown in FIG. 8.

The form of the invention illustrated in FIGS. 7 to 9 inclusive has much in common with the form first described insofar as cooperating steps and mechanism is concerned, for completely restraining the animal against side-ways movement, slipping or falling and positive predetermined positioning of the neck. Both forms have in common the factor and important step of providing support and further restraint to the entire animal just prior to and after the desensitizing or slaughtering thereof.

In FIG. 6 a form of apparatus is illustrated, embodying all of the features of the first form of our invention described, said view illustrating diagrammatically a turn-table type of device comprising a turn-table floor T suitably mounted for progressive turning on a base B and having a plurality of stalls X radially arranged thereon. The stalls are progressively moved from an animal entrance dock E counterclockwise to an animal discharge station D. Each of the stalls X is adapted to contain a large slaughter animal A such as the steer illustrated in one stall, the neck of the animal being confined by the cooperating jaws 18a and 18b and with its head as shown, enclosed within anesthetizing hood H.

An operator rides the turn-table T and upon restraint of the animal entering from the entrance dock E, applies the anesthetizing gas, or if stunning is desired, stuns the animal whereafter in slow progression the immobilized animal supported on a belly plate 21 is moved to station D in immobilized state with the hind legs dangling from the body support and at station D a shackle may be quickly applied to the two rear legs and the animal upended and hoisted to a trolley rail R and thereafter moved through the production line to a sticker's station.

From the foregoing description it will be seen that we have provided substantial improvements in method steps and apparatus for immobilizing and kosher slaughtering of animals such as cattle and goats, whereby with improved facilities for not only restraining the animal and precisely positioning of the heads thereof, the support of the weight of the animal immediately after immobilization and/or cutting of the throat is assured with the torso of the animal remaining in the previous normal position, and with the rear legs of the animal sustaining no part of the weight of the body. Thus, shackling of the hind leg or legs and subsequent immediate removal of the animal are greatly facilitated.

It will further be noted that our body-supporting means is readily adjustable and power-controlled for application to animals varying considerably in height and cooperates closely with other restraining elements to assure precise positioning of the neck and head of the animal and to prevent the animal from turning or slipping in a confining stall prior to or after immobilization.

It will of course be understood that various changes may be made in the form, details, arrangement and proportions of the parts without departing from the scope of our invention.

What is claimed is:

1. The method of positioning, restraining and supporting large large quadruped animals for slaughter as by kosher slaughter requirements, which consists in positioning the slaughter animal within a stall in predetermined standing position, lifting the body of the animal by application of upward pressure against the belly to an extent to support the torso substantially horizontally and independently of support from the animal's legs surrounding the neck of the animal with an anchored encircling medium, engaging the lower jaw of the animal and forcibly tilting the head of the animal upwardly to expose the throat portion, retaining the head in such tilted position and slaughtering the animal by transversely slashing the carotid artery and jugular vein.

2. The method set forth in preceding claim 1 further characterized by, after said slaughtering step, releasing said anchored encircling medium and upending the animal by shackling the hind legs thereof to a substantially elevated position with the torso and head suspended and without permitting the exposed tissue of the slaughter wound to contact against any contaminating media.

3. A method of predeterminably positioning, restraining, supporting and immobilizing large animals for slaughter which consists in bringing the slaughter animal into substantially a normal standing position in a stall, restricting forward and lateral movement of said animal, lifting the standing animal by applying upward pressure against the belly of the animal, to an extent to support the body independently of the legs of the animal encircling the neck portion of the animal to maintain the head in a substantially predetermined anchored position and then immobilizing the animal in said predetermined position whereafter the body of said animal will be supported from said body-supporting media with hind legs dangling.

4. The method set forth in claim 3 further characterized by shackling the dangling hind leg or legs of the animal and removing the animal to the shackling medum from the stall.

5. The method of predeterminatively supporting quadruped slaughter animals to facilitate immobilization and subsequent removal thereof, which consists in confining such an animal in a substantially predetermined, standing position within a stall or the like, lifting the body of said animal from said standing position by application of upward pressure against a substantial portion of the belly of the animal to an extent to support the body independently of support from the animal's legs, retaining the animal in said belly supported position during an immobilization or slaughtering operation, then shackling at least one of the hind legs of the animal and removing the animal from the support through power applied to the shackling medium.

6. The method set forth in claim 5 further characterized by clamping the neck of the animal in a predetermined position before immobilization or slaughter.

7. The method as set forth in claim 5 wherein the animal is immobilized by an anesthetizing gas while retained in the belly-supported position.

8. The method of predeterminatively supporting quadruped slaughter animals to facilitate immobilization and subsequent removal thereof, which consists in confining an animal in a predetermined standing position within a stall or the like, clamping the neck of the animal in a predetermined position before immobilization or slaughter, immobilizing the animal, lifting the body of the animal by application of upward pressure against a substantial portion of the belly of the animal to an extent to support the body substantially horizontally, then shackling at least one of the hind legs of the animal and removing the animal from the support through power applied to the shackling medium.

References Cited in the file of this patent

UNITED STATES PATENTS

| | | |
|---|---|---|
| 1,599,134 | King | Sept. 7, 1926 |
| 2,537,387 | Wnetrzak | Jan. 9, 1951 |
| 2,708,768 | Baim | May 24, 1955 |
| 2,895,164 | Murphy | July 31, 1959 |
| 3,027,594 | Moss | Apr. 3, 1962 |

FOREIGN PATENTS

| | | |
|---|---|---|
| 4,793 | Great Britain | 1908 |
| 14,348 | Great Britain | 1915 |
| 372,141 | Germany | Mar. 24, 1923 |